United States Patent
Zhang et al.

(10) Patent No.: US 7,092,677 B1
(45) Date of Patent: Aug. 15, 2006

(54) 2V SPDT SWITCH FOR HIGH POWER RF WIRELESS APPLICATIONS

(75) Inventors: Shuyun Zhang, Brookline, MA (US); Robert J. McMorrow, Concord, MA (US)

(73) Assignee: Analog Devices, Inc., Norwood, MA (US)

( * ) Notice: Subject to any disclaimer, the term of this patent is extended or adjusted under 35 U.S.C. 154(b) by 635 days.

(21) Appl. No.: 10/235,361

(22) Filed: Sep. 5, 2002

(51) Int. Cl.
*H04B 1/46* (2006.01)

(52) U.S. Cl. .............................. 455/78; 455/80; 455/82; 455/83

(58) Field of Classification Search .................. 455/78, 455/77, 79, 80, 81, 82, 83
See application file for complete search history.

(56) References Cited

U.S. PATENT DOCUMENTS

| | | | | |
|---|---|---|---|---|
| 4,803,447 | A * | 2/1989 | Schultz et al. ............... | 455/79 |
| 4,890,077 | A | 12/1989 | Sun | |
| 4,979,232 | A * | 12/1990 | Martz et al. .................. | 455/78 |
| 5,475,875 | A * | 12/1995 | Katsuyama et al. .......... | 455/78 |
| 5,514,992 | A | 5/1996 | Tanaka et al. | |
| 5,594,394 | A * | 1/1997 | Sasaki et al. ................. | 455/78 |
| 5,748,053 | A | 5/1998 | Kameyama et al. | |
| 6,373,291 | B1 | 4/2002 | Hamada et al. | |
| 6,721,544 | B1 * | 4/2004 | Franca-Neto ................. | 455/83 |
| 2001/0040479 | A1* | 11/2001 | Zhang .......................... | 455/80 |
| 2002/0177417 | A1* | 11/2002 | Visser .......................... | 455/78 |
| 2003/0171098 | A1* | 9/2003 | Tai et al. ...................... | 455/83 |

FOREIGN PATENT DOCUMENTS

| | | |
|---|---|---|
| EP | 0766396 | 4/1997 |
| EP | 0 700 161 A2 | 3/1999 |
| JP | 09238059 | 9/1997 |
| WO | WO 01/67602 | 9/2001 |
| WO | WO 02/067451 | 8/2002 |

OTHER PUBLICATIONS

"High-Performance GaAs Switch IC's Fabricated Using MESFET's with Two Kinds of Pinch-Off Voltages and a Symmetrical Pattern Configuration," Uda et al. *IEEE Journal of Solid-State Circuits*. Oct. 1994. vol. 29, No. 10.

"A Low-Voltage, High-Power T/R-Switch MMIC Using LC Resonators," Tokumitsu et al. *IEEE Transactions on Microwave Theory and Techniques*, May 1995. vol. 43, No. 5.

"GaAs High-Power RF Single-Pole Double-Throw Switch IC for Digital Mobile Communication System," Miyatsuji et al. *IEEE International Solid-State Circuit Conference*. 1994.

(Continued)

*Primary Examiner*—Lana Le
(74) *Attorney, Agent, or Firm*—Gauthier & Connors LLP

(57) ABSTRACT

A SPDT switch includes an antenna port. A transmitter section is coupled to a transmitter port. The transmitter section includes a plurality of transistors that are coupled in series relative to each other. A receiver section is coupled to a receiver port. The receiver section includes a plurality of transistors that are coupled in series relative to each other, so that when the transmitter section transmits high power to the antenna port, the receive section is effectively off to provide isolation to the receive port. The receiver port is coupled to the receiver section using at least one external capacitor. The at least one external capacitor is used to improve the power handling capability and harmonic performance of the switch.

22 Claims, 6 Drawing Sheets

OTHER PUBLICATIONS

"Novel High Performance SPDT Power Switches Using Multi-Gate FET's," McGrath et al. *IEEE MTT-S Digest*. 1991.

"A 3V MMIC hip Set for 1.9GHz Mobile Communication Systems," Tanaka et al. *IEEE International Solid-State Circuits Conference*. 1995.

"A High Power 2-18 GHz T/R Switch," Schindler et al. *IEEE MTT-S Digest*. 1990.

"Voltage-Tolerant Monolithic L-Band GaAs SPDT Switch," Cooper et al., *IEEE MTT-S Digest* (1989).

"A Dual-Gate Shorted-Anode Silicon-on-Insulator Lateral Insulated Gate Bipolar Transistor with Floating Ohmic Contact for Suppressing Snapback and Fast Switching Characteristics," Oh et al., *Microelectronics Journal 30* pp. 577-581 (1999).

\* cited by examiner

2V SPDT SWITCH FOR HIGH POWER RF WIRELESS APPLICATIONS

BACKGROUND OF THE INVENTION

The invention relates to the field of RF wireless applications, and in particular to a novel 2V SPDT design for high power RF and microwave applications.

In a GSM wireless communication system, a basic transmit/receive (T/R) switch is required to have high linearity to prevent adding noise in the form of harmonic distortion. This is particularly difficult when transmitting at full power with low battery voltage.

For a traditional GaAs switch, the maximum linear input power $P_{lin,max}$ is limited by the DC control voltage Vctrl, the number of gates n, and pinch-off voltage $V_p$ of the switch FET, which is defined as $$P_{lin\_max} = \frac{1}{2Z_0}[2n(V_p - V_{ctrl})]^2 \qquad \text{Eq. 1}$$

The equation 1 provides a first order estimate of the maximum linear input power of a typical SPDT switch designed with a multiple gate GaAs FET.

FIGS. 1A and 1B are a circuit diagram of a traditional SPDT and a graph of the gate-to-drain voltage and gate-to-source voltage of the FETs used in the traditional SPDT, respectively. FIG. 1A is a schematic of a traditional SPDT dual-gate switch 3. The SPDT dual gate switch 3 includes FETs 1 and 2. FETs 1 and 2 include a gate (g), drain (d), and source (s). Also, the SPDT dual-gate switch 3 includes a receive port Rx, transmitter port Tx, and two DC control voltages Vctrl. The transmitter port Tx is connected to the drain of FET 1. The source of FET 1 is connected to the antenna port. Two resistors with values of R are connected in parallel, where one end of the parallel resistors is connected to the gate of FET 1 and the other end is connected to one of the two DC control voltages.

The drain of FET 2 is connected to the antenna port Ant, and the source is connected to the receiver port Rx. A second set of parallel resistors R is connected to the drain of FET 2. The other end of the second set of parallel resistors is connected to the second DC voltage control source Vctrl.

If the required $P_{lin,max}$ is 35 dBm, n=3, $V_p$=−0.3 V, and $Z_0$=50 ohms, the highest Vctrl is 3.3 V. This means that the traditional GaAs FET T/R switch cannot handle an input power of 35 dBm without compression at the receive section of the SPDT switch, as shown in FIG. 1A.

FIG. 1B is a graph demonstrating that in the first half signal period the gate-to-drain voltage (Vgd) of the FET 1 and the gate-to-drain voltage of the FET 2 is greater than the pinch-off Vp, and in the second half signal period the gate to source voltages (Vgs) of the FETs 1 and 2 are also greater than the pinch-off voltage Vp. The problem is that whenever the Vgd or Vgs is greater than the pinch-off voltage Vp for the FETs in the off branch, the FET switch may be conducting a RF signal to ground (RF bleeding). This causes high insertion losses and power compression, which leads to the creation of harmonic distortions.

To improve the linearity at low control voltages and high power conditions, a multiple dual gate transistor structure is needed in the final design to obtain high isolation and low insertion loss at GSM and DCS frequencies.

SUMMARY OF THE INVENTION

According to one aspect of the invention, there is provided a SPDT switch. The SPDT switch includes an antenna port. A transmitter section is coupled to a transmitter port. The transmitter section includes a plurality of transistors that are coupled in series relative to each other. The transmitter section including a plurality of transistors having a plurality of gates are coupled in series relative to each other. A receiver section is coupled to a receiver port. The receiver section includes a plurality of transistors that are coupled in series relative to each other, so that when the transmitter section transmits high power to the antenna port, the receive section is effectively off to provide isolation to the receive port. The receiver port is coupled to the receiver section using at least one external capacitor. The at least one external capacitor is used to improve the power handling capability and harmonic performance of the switch.

According to another aspect of the invention, there is a method of minimizing distortion in a SPDT switch. The method includes providing an antenna port. A transmitter section is provided that is coupled to a transmitter port. The transmitter section including a plurality of transistors having a plurality of gates are coupled in series relative to each other. A receiver section is provided that is coupled to a receiver port. The receiver section includes a plurality of transistors having a plurality of gates that are coupled in series relative to each other, so that when said transmitter section transmits high power to said antenna port, the receive section is effectively off to provide isolation to said receive port and minimizing distortions. The receiver port is coupled to the receiver section using at least one external capacitor. The at least one external capacitor is used to improve the power handling capability and harmonic performance of the switch.

DETAILED DESCRIPTION OF THE INVENTION

The invention is based on a new design for a transmitter-receiver (T/R) switch, which is based on field effect transistors, such as MOSFET, MESFET, or pHEMT. The invention uses 3 series dual-gate FETs, which provide reduced parasitics over a single dual-gate FET that will be described hereinbelow in FIG. 2A. The isolation of the T/R switch is increased at higher frequencies.

Figure 1A:
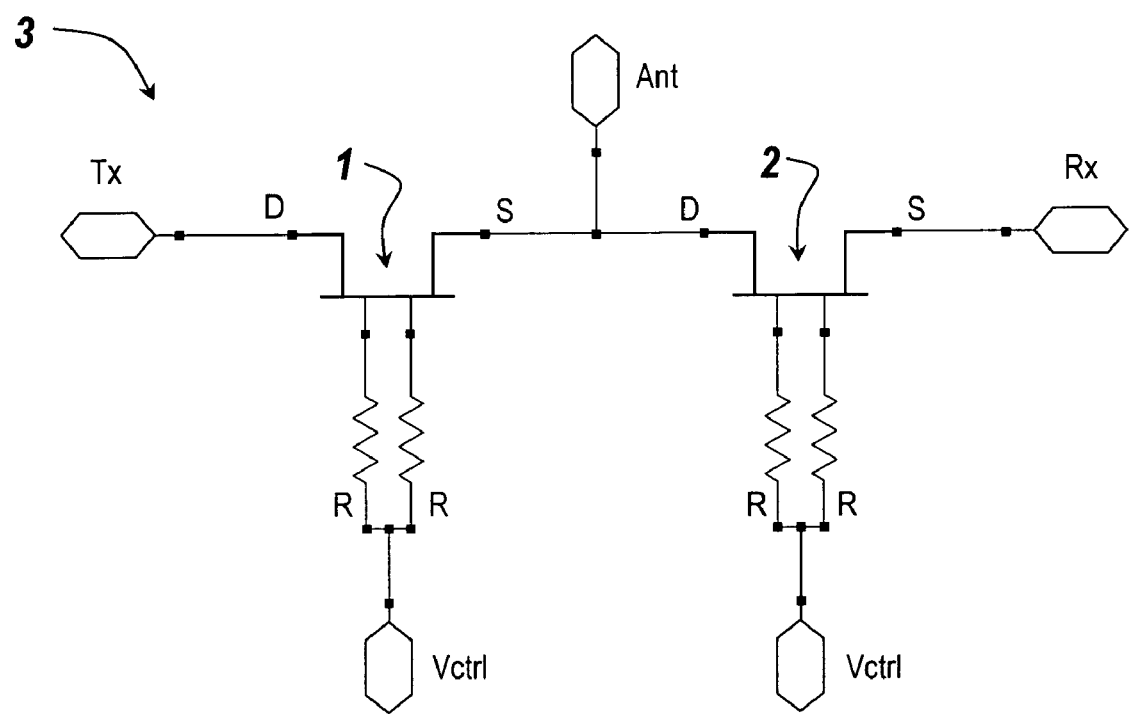
FIGS. 1A and 1B are a circuit diagram of a traditional SPDT and a graph of the gate-to-drain voltage and gate-to-source voltage of FETs used in the traditional SPDT, respectively.
Figure 1B:
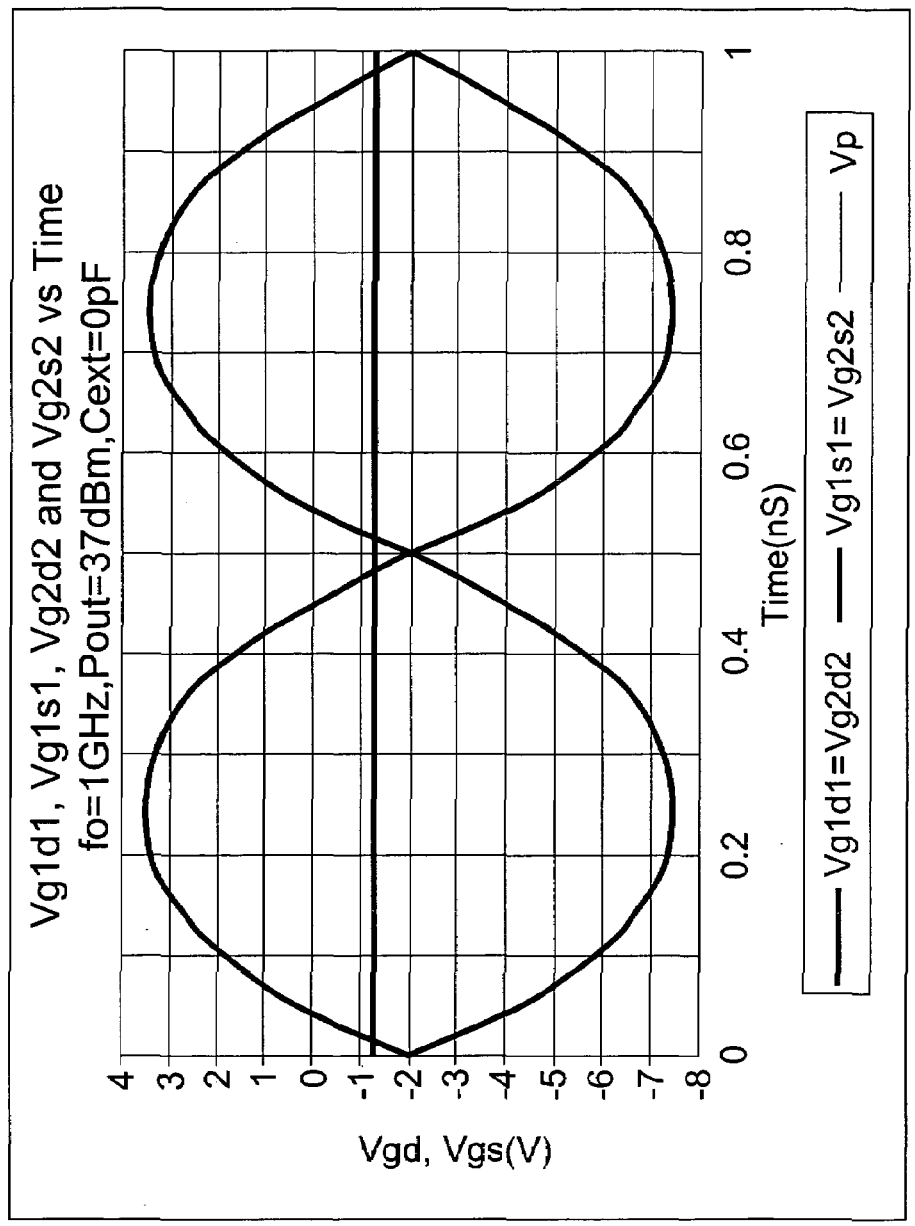
Figure 2A:
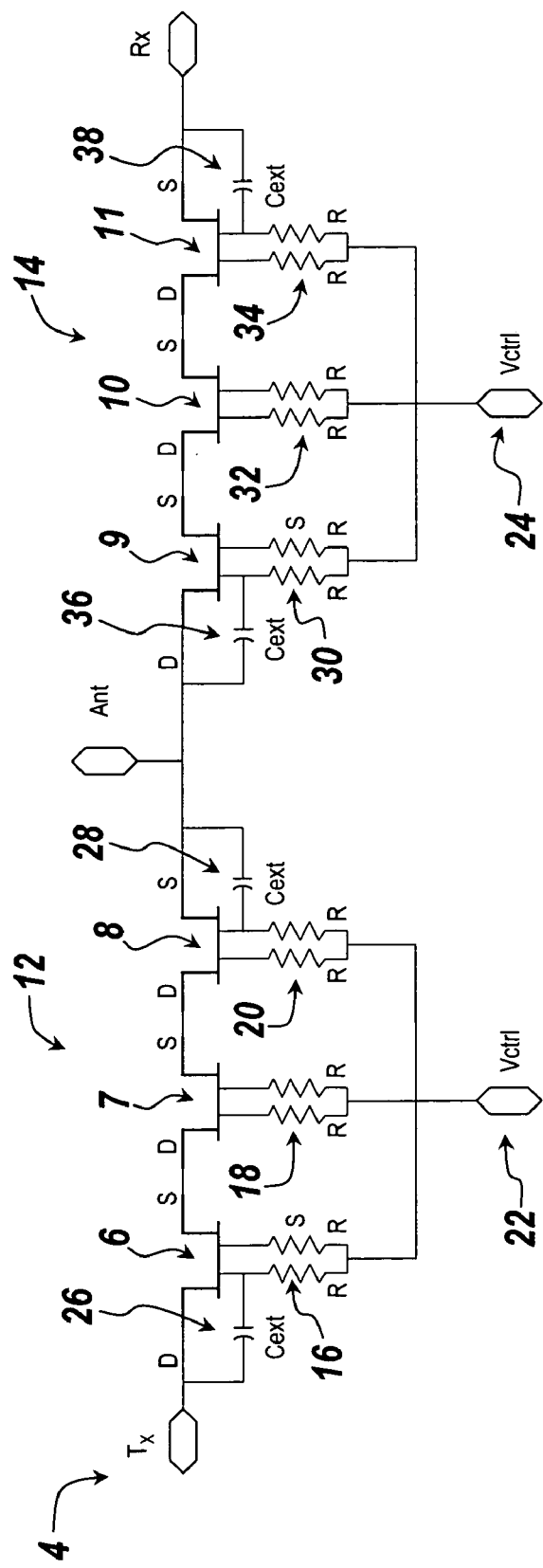
FIGS. 2A and 2B are a circuit diagram of a novel SPDT and a graph of the gate-to-drain voltage and gate-to-source voltage of FETs used in the novel SPDT, respectively.
Figure 2B:
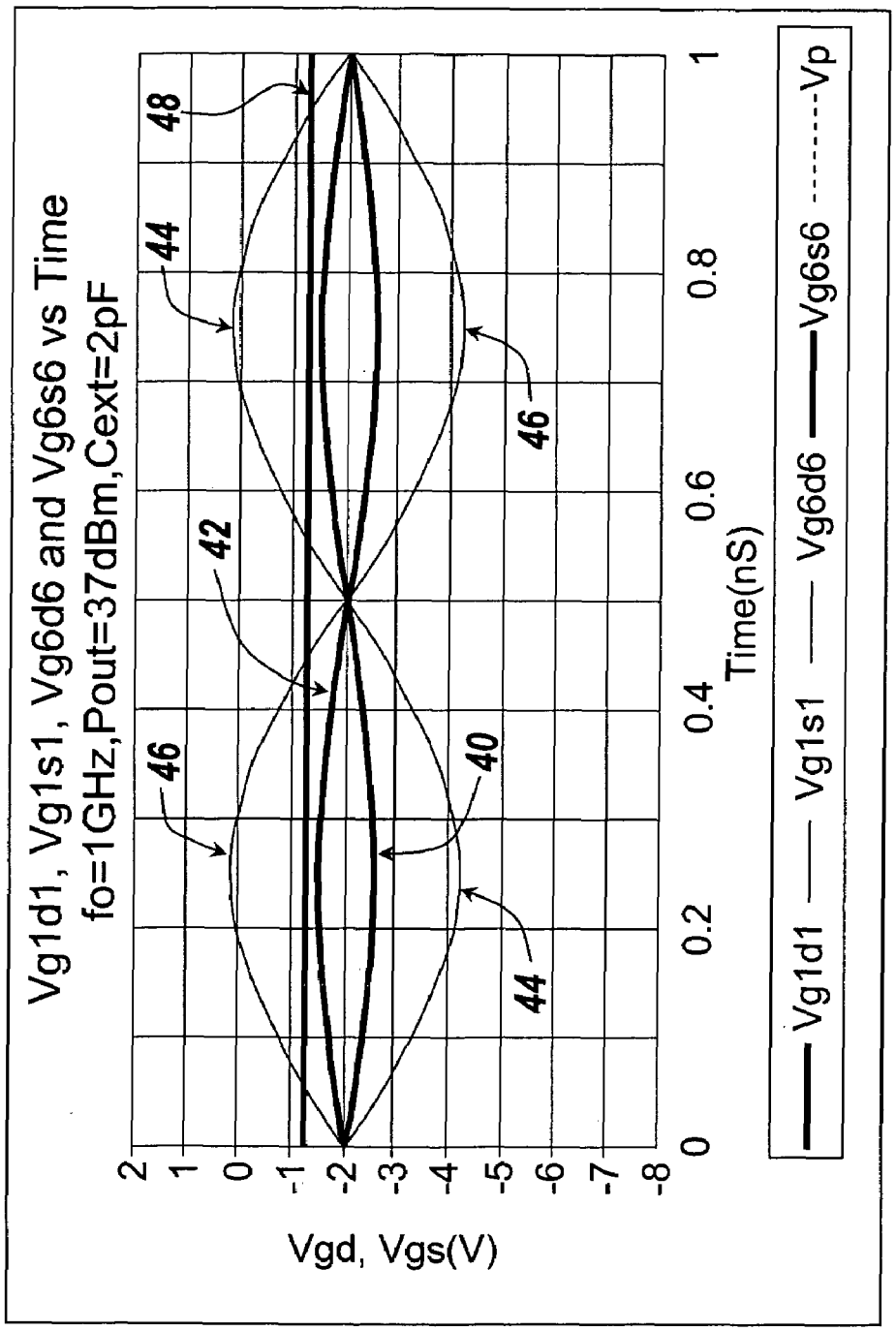

FIGS. 2A and 2B are a circuit diagram of a novel SPDT and a graph of the gate-to-drain voltage and gate-to-source voltage of FETs used in the novel SPDT, respectively. The SPDT 4 is divided in two sections, the transmitter section that includes all the elements on the left side of the antenna port Ant, and a receiver section that includes all the elements on the right side of the antenna port Ant. The transmitter section 12 includes FETs 6, 7, and 8, and each of these FET 6, 7, and 8 are dual gate FETs having at least two gates in this embodiment. The drain of the FET 6 is connected to the transmitter port Tx. The dual gates of the FET 6 are connected to a first set 18 of resistors, each of the resistors of the first set 18 has a resistance of R, and they are connected to a first DC voltage control source 22. The source of the FET 6 is connected to the drain of FET 7, and the gates of FET 7 are connected to a second set 18 of resistors, where each of the resistors has a resistance of R. Also, the second set 18 of resistors are connected to the DC voltage control source 22. The source of the FET 7 is connected to the drain of FET 8, and the gates of FET 8 are connected to a third set 20 of resistors, where each of the resistors has a resistance of R. The third set 20 of resistors are also connected to the voltage control source 22. The source of the FET 8 is connected to the antenna port Ant.

The first end of an external capacitor 26 is connected to the transmitter port Tx, and the second end is connected to one of the resistors of the first set 16 of resistors. Also, the first end of an external capacitor 28 is connected to the antenna port Ant, and its second end is connected to one of the resistors of the third set 20 of resistors.

The receiver section 14 of the SPDT 4 includes FETs 9, 10, and 11. The drain of the FET 9 is connected to the antenna port, the gate of the FET 9 is connected to a fourth set 30 of resistors, where each of the resistors has a value of R, and are connected to the gates of FET 9. They are also connected to a second DC voltage control source 24. The source of the FET 9 is connected to the drain of the FET 10, the gates of the FET 10 are connected to a fifth set 32 of resistors. The fifth set 32 of resistors are also connected to the second DC voltage control source 24. The source of the FET 10 is connected to drain of FET 11. The gates of FET 11 are connected to a sixth set 34 of resistors, each of these resistors also has a resistance of R, and they are connected to the second DC voltage control source 24. The source of the FET 11 is connected to the receiver port Rx.

An external capacitor 36 is connected to the antenna port Ant and to one of the resistors of the fourth set 30 of parallel resistors. Another external capacitor 38 is connected to the receiver port Rx and to one of the resistors of the sixth set 34 of parallel resistors.

The SPDT 4 transmits high power to the antenna port Ant, the receive section 14 is supposed to be off to provide high isolation to the receive port Rx. However, the high output power applied to the off FETs 9, 10, and 11 of the receive section 14 can turn some of the FETs back on. With external capacitors 26, 28, 36, and 38, the power handling capability of the switch is increased. This is because the main distortion mechanism of the SPDT 2, to be discussed more hereinafter.

If the gate to drain voltage (Vgd) or the gate to source (Vgs) is greater than the pinch-off voltage Vp of a FET, the FET will start to turn on. In this case, this will cause RF power "bleeding" to ground through the receive port Rx, therefore increasing harmonic distortion.

In the invention, the distortion is greatly improved by adjusting the Vgd and Vgs of each individual off FET. This is accomplished in two steps. First, use 3 dual gate FETs 9, 10, and 11 in series to emulate a 6 gate FET, therefore the peak-to-peak voltage is significantly reduced. Second, by adding the external capacitors 26, 28, 36, and 38 between the gate and drains of FETs 6 and 9 and gate and source of FETs 8 and 11, respectively, this further reduces the peak-to-peak voltage.

FIG. 2B shows a graph indicative of the gate to drain voltage (Vgd) 42 and the gate to source voltage (Vgs) 46 of the FET 1, the Vgd 40 and Vgs 44 of the FET 6, and the pinch-off voltage (Vp) 48. In particular, FIG. 3B demonstrates that during the second half period the Vgd 42 and Vgs 46 of the FET 1 are less than the pinch-off voltage Vp, and in the first half period the Vgd 40 and Vgs 44 of the FET 6 are less than the pinch-off voltage Vp. This indicates that in the first half period the FET 6 is off and in the second half period the FET 1 is off, therefore it guarantees that the whole receive section is always off. This results in a great deal of improvement for power handling and harmonic reduction.

Figure 3:
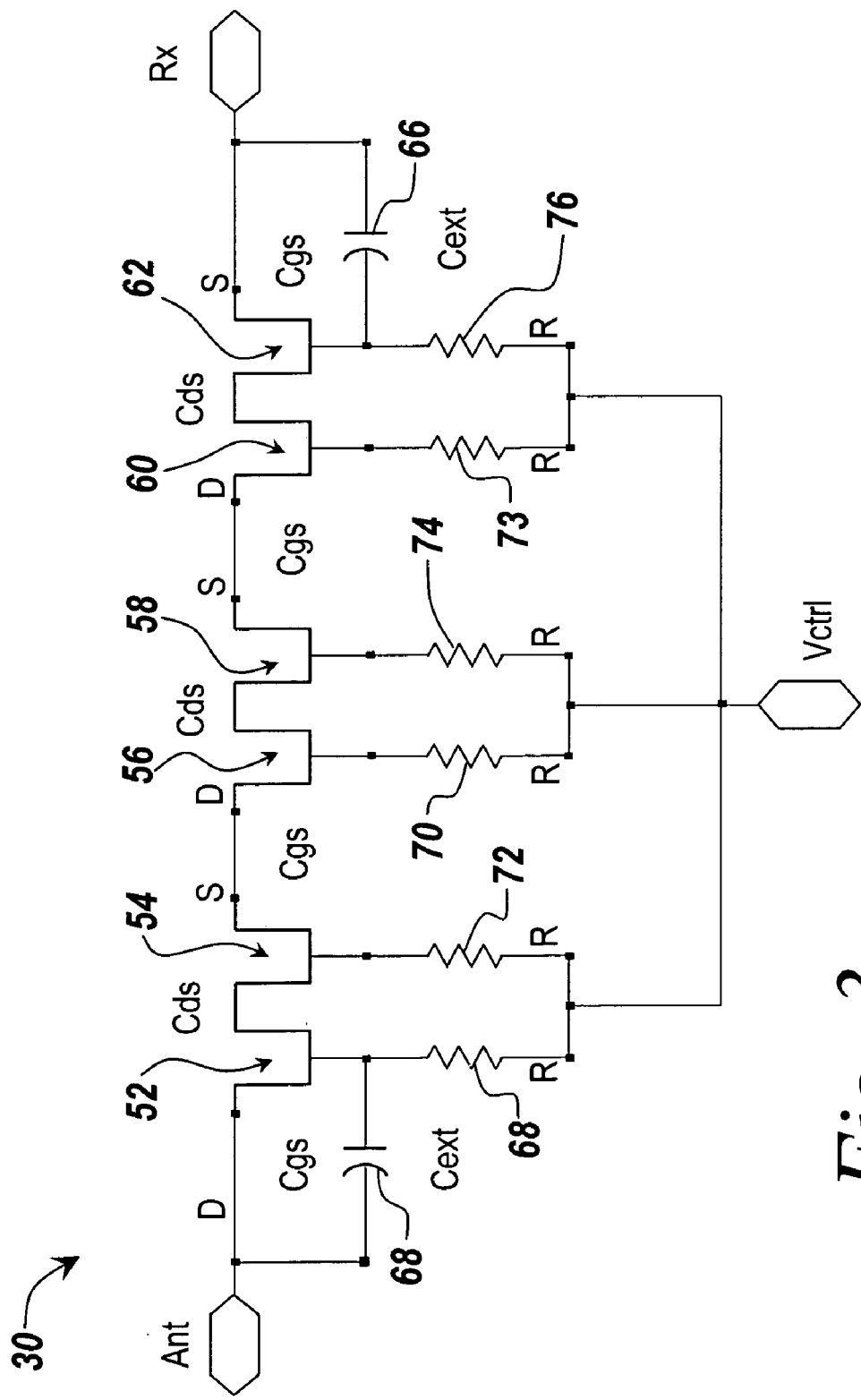
FIG. 3 is a circuit diagram demonstrating an equivalent circuit for off FETs.

FIG. 3 is a circuit diagram demonstrating an equivalent circuit for off FETs. The 3 dual-gate off FETs are approximately the same, and each one is symmetrical from the drain to the source side. It is assumed that $C_{gsoff}=C_{gdoff}$ in this embodiment. A typical PHEMT commonly used for this embodiment will have a $C_{gsoff}$ and $C_{gdoff}$ in the range of 0.1–0.3 pF/mm, and a power switch can use FET sizes in the range of 1–3 mm. In this embodiment, a symmetrical device structure is used resulting in $C_{gsoff}=C_{gdoff}$. In other embodiments where an asymmetrical device might be employed, these two values can be different.

For the off FETs, an equivalent circuit for a receive section 50 is provided, as shown in FIG. 3. The receive section 50 includes an antenna port Ant and a receiver port Rx. The drain of a FET 52 is connected to the antenna port Ant, and the gate of the FET 52 is connected to a resistor 68 having a resistance R. The resistor 68 is also connected to a DC voltage control source Vctrl. An external capacitor 64 is connected to the gate of the FET 52 and the antenna port Ant. The source of the FET 52 is connected to the drain of a FET 54. The Vgd and Vgs of the FET 52 is defined as $$Vgd = Vctrl - \frac{C_{gsoff}}{12C_{gsoff} + 10C_{ext}} V_d \sin(2\pi f_0 t) \qquad \text{Eq. 2}$$

$$Vgs = Vctrl + \frac{C_{gsoff} + C_{ext}}{12C_{gsoff} + 10C_{ext}} V_d \sin(2\pi f_0 t) \qquad \text{Eq. 3}$$

where fo is the operational frequency, Cext is the capacitance of the external capacitor 64, and Vd is the voltage applied at the drain.

The gate of the FET 54 is connected to a resistor 72, and the source of the FET 54 is connected to the drain of a FET 56. The resistor 72 is also connected to the DC voltage control source Vctrl, and has a resistance of R. The Vgd and Vgs of the FET 54 is defined as $$Vgd = Vctrl - \frac{C_{gsoff} + C_{ext}}{12C_{gsoff} + 10C_{ext}} V_d \sin(2\pi f_0 t) \qquad \text{Eq. 4}$$

$$Vgs = Vctrl + \frac{C_{gsoff} + C_{ext}}{12C_{gsoff} + 10C_{ext}} V_d \sin(2\pi f_0 t). \qquad \text{Eq. 5}$$

The drain of FET 56 is connected to a resistor 70, and its source is connected to the drain of a FET 58. The resistor 70 is also connected to the DC voltage control source Vctrl, and has a resistance of R. The Vgd and Vgs of the FET 56 is defined as $$Vgd = Vctrl - \frac{C_{gsoff} + C_{ext}}{12C_{gsoff} + 10C_{ext}} V_d \sin(2\pi f_0 t) \qquad \text{Eq. 6}$$

$$Vgs = Vctrl + \frac{C_{gsoff} + C_{ext}}{12C_{gsoff} + 10C_{ext}} V_d \sin(2\pi f_0 t). \qquad \text{Eq. 7}$$

The gate of FET 58 is connected to a resistor 74, and the source of FET 58 is connected to the drain of a FET 60. The resistor 74 is also connected to the DC voltage control source Vctrl, and has a resistance of R. The Vgd and Vgs of the FET 58 is defined as $$Vgd = Vctrl - \frac{C_{gsoff} + C_{ext}}{12C_{gsoff} + 10C_{ext}} V_d \sin(2\pi f_0 t) \qquad \text{Eq. 8}$$

$$Vgs = Vctrl + \frac{C_{gsoff} + C_{ext}}{12C_{gsoff} + 10C_{ext}} V_d \sin(2\pi f_0 t). \qquad \text{Eq. 9}$$

The gate of FET 60 is connected to a resistor 73, and the source is connected to the drain of a FET 62. The resistor 73 is also connected to the DC voltage control source Vctrl, and has a resistance of R. The Vgd and Vgs of the FET 60 is defined as $$Vgd = Vctrl - \frac{C_{gsoff} + C_{ext}}{12C_{gsoff} + 10C_{ext}} V_d \sin(2\pi f_0 t) \qquad \text{Eq. 10}$$

$$Vgs = Vctrl + \frac{C_{gsoff} + C_{ext}}{12C_{gsoff} + 10C_{ext}} V_d \sin(2\pi f_0 t). \qquad \text{Eq. 11}$$

The gate of FET 62 is connected to a resistor 76, and source is connected to drain of the receiver port Rx. The resistor 76 is also connected to the DC voltage control source Vctrl, and has a resistance of R. An external capacitor 66 is connected to the gate of FET 62 and the receiver port Rx. The Vgd and Vgs of the FET 62 is defined as $$Vgd = Vctrl - \frac{C_{gsoff} + C_{ext}}{12C_{gsoff} + 10C_{ext}} V_d \sin(2\pi f_0 t) \qquad \text{Eq. 12}$$

$$Vgs = Vctrl + \frac{C_{gsoff} + C_{ext}}{12C_{gsoff} + 10C_{ext}} V_d \sin(2\pi f_0 t). \qquad \text{Eq. 13}$$

In this embodiment, the external capacitors 64 and 66 are assigned to have equal capacitance, Cext.

From equations 2–13, the relationship between the capacitance of the external capacitors 64 and 66 and Vgd of the FET 52 or Vgs of FET 58 can be determined. By increasing the capacitance of the external capacitors 64 and 66 results in decreasing the RF peak—peak magnitude of the Vgd of the FET 52 and the Vgs of the FET 58. The circuit arrangement of FIG. 4 has the behavior that in the first half cycle the Vgd and Vgs of the FET 58 are less than the pinch-off voltage Vp, and in the second half cycle the Vgs and Vgd of the FET 52 are less than pinch-off voltage Vp. This establishes that in the first half cycle the FET 58 is pinched off and in the second half cycle the FET 52 is pinched off, therefore the receive path remains pinched off over the whole period. This analysis is based on the operational frequency being 900 MHz, 36 dBm of input power, and −1.0 V pinch-off voltage.

Figure 4:
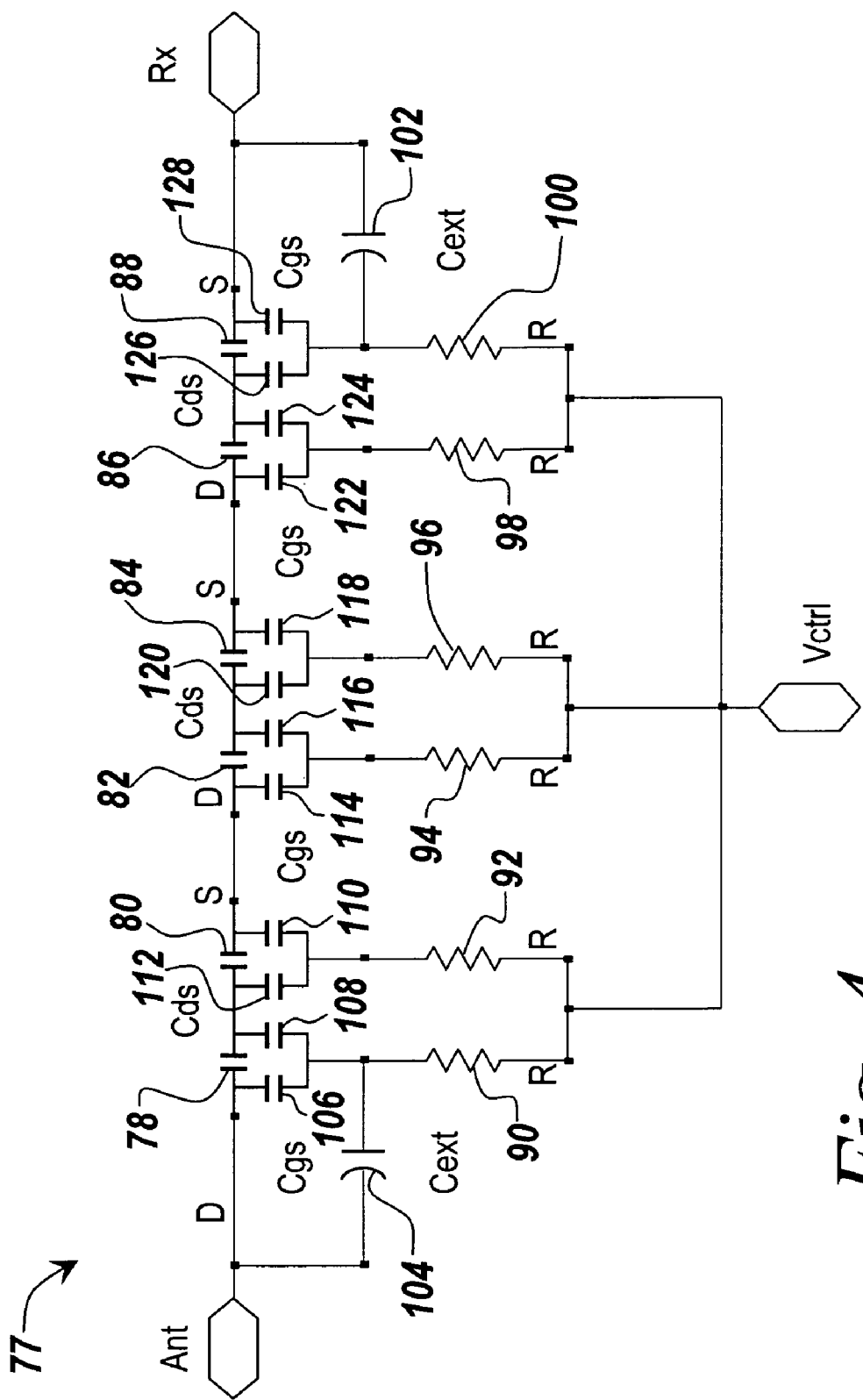
FIG. 4 is a circuit diagram demonstrating an equivalent circuit for off FETs under small signal analysis.

FIG. 4 is a circuit diagram demonstrating an equivalent circuit for off FETs under small signal analysis. The receiver section 77 includes a receiver port Rx, an antenna port Ant, and a DC voltage control source Vctrl. In this arrangement, the FETs 52–58 of FIG. 4 are modeled as capacitors, because in the small signal range most FETs possess large capacitive properties. Each FET is modeled to have two parallel gate-to-source capacitors (Cgs) and a drain-to-source capacitor (Cds).

A drain-to-source capacitor 78 is associated with the FET 52, and is connected to the antenna port Ant and a drain to source capacitor 80 associated with the FET 54. The gate-to-source capacitors 106 and 108 are associated with FET 52. The first end of the gate-to-source capacitor 106 is connected to the first end of the drain-to-source capacitor 78, and its second end is connected to the first end of a resistor 90 that has a resistance value R. The first end of the gate-to-source capacitor 108 is connected to the second end of the capacitor 78, and its second end is connected to the first end of the resistor 90. The resistor 90 is also connected to a DC voltage control source Vctrl.

The second end of the drain-to-source capacitor 80 is connected to the first end of a drain-to-source capacitor 82 that is associated with the FET 56. Gate-to-source capacitors 112 and 110 are associated with the FET 54. The first end of the gate-to-source capacitor 112 is connected to the first end of the drain-to-source capacitor 80, and its second end is connected to the first end of a resistor 92 having a resistance R. The first end of the gate-to-source capacitor 110 is connected to the second end of the drain-to-source capacitor 80, and its second end is connected to the first end of the resistor 92. The second end of the resistor 92 is connected to the DC voltage control source Vctrl.

The second end of the drain-to-source capacitor 82 is connected to the first end of a drain-to-source capacitor 84 that is associated with the FET 58. Gate-to-source capacitors 114 and 116 are associated with the FET 56. The first end of the gate-to-source capacitor 114 is connected to the first end of the drain-to-source capacitor 82, and its second end is connected to the first end of a resistor 94 having a resistance R. The first end of the gate-to-source capacitor 116 is connected to the second end of the drain-to-source capacitor 82, and the second end of the gate-to-source capacitor 110 is connected to the first end of the resistor 94. The second end of the resistor 94 is connected to the DC voltage control source Vctrl.

The second end of the drain-to-source capacitor 84 is connected to the first end of a drain-to-source capacitor 86 that is associated with the FET 60. Gate-to-source capacitors 120 and 118 are associated with the FET 58. The first end of the gate-to-source capacitor 120 is connected to the first end of the drain-to-source capacitor 84, and its second end is connected to the first end of a resistor 96 having a resistance R. The first end of the gate-to-source capacitor 118 is connected to the second end of the drain-to-source capacitor 84, and its second end is connected to the first end of the resistor 96. The second end of the resistor 96 is connected to the DC voltage control source Vctrl.

The second end of the drain-to-source capacitor 86 is connected to the first end of a drain-to-source capacitor 88 that is associated with the FET 62. Gate-to-source capacitors 122 and 124 are associated with the FET 60. The first end of the gate-to-source capacitor 122 is connected to the first end of the drain-to-source capacitor 86, and its second end is connected to the first end of a resistor 98 having a resistance R. The first end of the gate-to-source capacitor 124 is connected to the second end of the drain-to-source capacitor 86, and its second end is connected to the first end of the resistor 98. The second end of the resistor 98 is connected to the DC voltage control source Vctrl.

The second end of the drain-to-source capacitor 88 is connected to the receiver port. Gate-to-source capacitors 126 and 128 are associated with the FET 62. The first end of the gate-to-source capacitor 126 is connected to the first end of the drain-to-source capacitor 88, and its second end is connected to the first end of a resistor 100 having a resistance R. The first end of the gate-to-source capacitor 128 is connected to the second end of the drain-to-source capacitor 88, and its second end is connected to the first end of the resistor 100. The second end of the resistor 100 is connected to the DC voltage control source Vctrl.

An external capacitor 104 is connected to the antenna port and to the resistor 90. Another external capacitor 102 is connected to the receiver port Rx and resistor 100. These capacitors are used to keep the FETs in the off branch pinched-off, and improve the power handling capability and harmonic performance of the switch. Additional external capacitors (not shown) may be used to isolate the DC voltage used to control the switch from the rest of the system. These caps should be large enough to function as DC blocking capacitors.

The invention provides a novel 2V SPDT switch design for high power RF and microwave applications, such as GSM handset applications. It has a low insertion loss, high linear output power, and low harmonic distortion. Compared with traditional designs, the new design offers an improved power compression point and $2^{nd}$ and $3^{rd}$ harmonic distortion, while operating with control voltages of 2.0 V. This is a significant improvement in comparison with other switches in the art.

The gate-to-source capacitors and drain-to-source capacitors are primarily based on the dimensions of the FET being used, and they can vary by length of their respective dimensions. In this embodiment, the drain-to-source capacitance is approximately 0.01 pF per millimeter, the gate-to-drain and gate-to-source capacitances are between 0.2 pF and 0.3 pF. Also, the external capacitors 104 and 106 have capacitances between 2 and 3 pF, in this embodiment.

The techniques presented by invention can be extended to include additional branches and ports. That is, a switch could be constructed in like manner that has two or more receive branches and ports, and/or two or more transmit branches and ports.

Although the present invention has been shown and described with respect to several preferred embodiments thereof, various changes, omissions and additions to the form and detail thereof, may be made therein, without departing from the spirit and scope of the invention.

What is claimed is:

1. A SPDT switch comprising:
   an antenna port;
   a transmitter section that is coupled to a transmitter port, said transmitter section including a plurality of first transistors that are coupled in series relative to each other wherein the drain of each successive first transistor is connected to the source of an adjacent transistor; and
   a receiver section that is coupled to a receiver port, said receiver section including a plurality of second transistors that are coupled in series relative to each other wherein the drain of each successive second transistor is connected to the source of an adjacent transistor, so that when said transmitter section transmits high power to said antenna port, the receiver section is effectively off to provide isolation to said receive port; wherein
   said receiver port is coupled to said receiver section using at least one first external capacitor, said at least one first external capacitor being used to improve the power handling capability and harmonic performance of the switch;
   said transmitter port is coupled to said transmitter section using at least one second external capacitor, said second external capacitor being used to improve the power handling capability and harmonic performance of the switch.

2. The SPDT switch of claim 1, wherein said plurality of transistors of said transmitter section are each coupled to a set of resistors.

3. The SPDT switch of claim 2, wherein said resistors are coupled to a DC voltage control source.

4. The SPDT switch of claim 1, wherein said plurality of transistors of said receiver section are each coupled to a set of resistors.

5. The SPDT switch of claim 4, wherein said resistors are coupled to a DC voltage control source.

6. The SPDT switch of claim 1, wherein said antenna port is coupled to said transmitter section.

7. The SPDT switch of claim 1, wherein said antenna port is coupled to said receiver section.

8. The SPDT switch of claim 1, wherein said antenna port is coupled to said transmitter section using at least one third external capacitor, said at least one third external capacitor being used to improve the power handling capability and harmonic performance of the switch.

9. The SPDT switch of claim 1, wherein said antenna port is coupled to said receiver section using at least one fourth external capacitor, said at least one fourth external capacitor being used to improve the power handling capability and harmonic performance of the switch.

10. The SPDT switch of claim 1, wherein said gates of said transistors of said transmitter section are connected to resistors.

11. The SPDT switch of claim 1, wherein said gates of said transistors of said receiver section are connected to resistors.

12. A method of minimizing distortion in a SPDT switch, said method comprising:
   providing an antenna port;
   providing a transmitter section that is coupled to a transmitter port, said transmitter section including a plurality of first transistors having a plurality of gates are coupled in series relative to each other wherein the drain of each successive first transistor is connected to the source of an adjacent transistor;
   providing a receiver section that is coupled to a receiver port, said receiver section including a plurality of second transistors having a plurality of gates are coupled in series relative to each other wherein the drain of each successive second transistor is connected to the source of an adjacent transistor, so that when said transmitter section transmits high power to said antenna port, the receive section is effectively off to provide isolation to said receive port and minimizing distortions;

using at least one first external capacitor to be coupled to said receiver port, said at least one first external capacitor is used to improve the power handling capability and harmonic performance of the switch; and using at least one second external capacitor to be coupled to said transmitter port, said at least one external capacitor is used to improve the power handling capability and harmonic performance of the switch.

13. The method of claim 12, wherein said plurality of transistors of said transmitter section are each coupled to a set of resistors.

14. The method of claim 13, wherein said resistors are coupled to a DC voltage control source.

15. The method of claim 12, wherein said plurality of transistors of said receiver section are each coupled to a set of resistors.

16. The method of claim 15, wherein said resistors are coupled to a DC voltage control source.

17. The method of claim 12, wherein said antenna port is coupled to said transmitter section.

18. The method of claim 12, wherein said antenna port is coupled to said receiver section.

19. The method of claim 12, wherein said antenna port is coupled to said transmitter section using at least one third external capacitor, said at least one third external capacitor used to improve the power handling capability and harmonic performance of the switch.

20. The method of claim 12, wherein said antenna port is coupled to said receiver section using at least one fourth external capacitor, said at least one fourth external capacitor used to improve the power handling capability and harmonic performance of the switch.

21. The method of claim 12, wherein said gates of said transistors of said transmitter section are connected to resistors.

22. The method of claim 12, wherein said gates of said transistors of said receiver section are connected to resistors.

* * * * *